United States Patent [19]

Crivello

[11] 4,173,551

[45] Nov. 6, 1979

[54] HEAT CURABLE COMPOSITIONS

[75] Inventor: James V. Crivello, Elnora, N.Y.

[73] Assignee: General Electric Company, Schenectady, N.Y.

[21] Appl. No.: 861,128

[22] Filed: Dec. 16, 1977

Related U.S. Application Data

[63] Continuation-in-part of Ser. No. 781,785, Mar. 28, 1977, abandoned, which is a continuation-in-part of Ser. No. 689,247, May 24, 1976, abandoned, which is a continuation-in-part of Ser. No. 638,982, Dec. 9, 1975, Pat. No. 4,058,401, Ser. No. 638,983, Dec. 9, 1975, and Ser. No. 638,994, Dec. 9, 1975, Pat. No. 4,069,055, said Ser. No. 638,982, is a continuation of Ser. No. 466,374, May 2, 1974, abandoned, said Ser. No. 638,983, is a continuation of Ser. No. 466,375, May 2, 1974, abandoned, said Ser. No. 638,994, is a continuation of Ser. No. 466,378, May 2, 1974, abandoned.

[51] Int. Cl.$^2$ .................... C08G 59/68; C08G 8/10; C08F 4/00; C08F 4/06

[52] U.S. Cl. .................... 260/18 EP; 528/355; 528/356; 260/37 EP; 528/357; 528/408; 526/89; 528/409; 528/410; 526/90; 528/411; 528/412; 526/131; 528/416; 528/423; 526/192; 526/193; 526/195; 528/13; 528/14; 528/15; 528/19; 528/88; 528/89; 528/90; 528/91; 528/92; 528/93; 528/137; 528/138; 528/139; 528/141; 528/143; 528/232; 528/234; 528/235; 528/236; 528/238; 528/240; 528/242; 528/312; 528/313; 528/319

[58] Field of Search .......... 528/88, 89, 91, 92, 528/138, 139, 141, 143, 234, 238, 242, 232, 235, 240, 313, 318, 312, 319, 408, 409, 412, 416, 423, 356, 357, 355, 93, 90, 137, 410, 13, 14, 15, 19; 526/193, 192, 195, 90, 131, 89; 260/37 EP, 18 EP

[56] References Cited

U.S. PATENT DOCUMENTS

| | | | |
|---|---|---|---|
| 3,691,133 | 9/1972 | Sura | 260/47 EC |
| 4,058,401 | 11/1977 | Crivello | 96/115 R |
| 4,069,055 | 1/1978 | Crivello | 96/115 R |

OTHER PUBLICATIONS

Lee & Neville, "Handbook of Epoxy Resins," McGraw-Hill, 1967, pp. 12-13 to 12-16, 12-22, and 12-23.

Billmeyer, "Textbook of Polymer Science," Interscience, 1962, pp. 463-472.

*Primary Examiner*—Earl A. Nielsen
*Attorney, Agent, or Firm*—William A. Teoli; Joseph T. Cohen; Charles T. Watts

[57] ABSTRACT

Aromatic onium salts, such as diaryliodonium salts, have been found to be effective thermal initiators for the polymerization of a variety of cationically polymerizable materials including epoxides, cyclic ethers, phenol formaldehyde resins, etc., when used in combination with various cocatalysts such as organic acids and copper salts.

16 Claims, No Drawings

HEAT CURABLE COMPOSITIONS

This application is a continuation-in-part of my copending application Ser. No. 781,785, filed Mar. 28, 1977 now abandoned, which is a continuation-in-part application of copending application Ser. No. 689,247, filed May 24, 1976 now abandoned, which is a continuation-in-part of copending applications Ser. Nos. 638,982, now U.S. Pat. No. 4,058,401, 638,983 and 638,994, now U.S. Pat. No. 4,069,055 filed concurrently on Dec. 9, 1975, which are continuation applications, respectively of applications Ser. Nos. 466,374, 466,375 and 466,378, filed concurrently on May 2, 1974, now abandoned, where all the aforementioned applications are assigned to the same assignee as the present invention.

The present invention relates to heat curable compositions comprising a cationically polymerizable organic material, such as an epoxy resin, and an effective amount of a diaryliodonium salt used in combination with a cocatalyst such as a copper salt, an organic acid or mixtures thereof.

As shown in my copending application Ser. No. 781,785, filed Mar. 28, 1977, diaryliodonium salts of the formula, $$[(R)_a(R^1)_bI]_c^+[MQ_d]^{-(d-e)}, \quad (I)$$

can be used in combination with a copper salt, such as copper benzoate to effect the thermal cure of an epoxy resin, where R is a monovalent aromatic organic radical, $R^1$ is a divalent aromatic organic radical, M is a metal or metalloid, Q is a halogen radical, a is a whole number equal to 0 or 2, b is a whole number equal to 0 or 1 and the sum of $a+b$ is equal to 2 or the valence of I, $c=d-e$, e equals the valence of M and is an integer equal to 2-7 inclusive and $d>e$ and is an integer having a value up to 8.

I also have found that heat curable cationically polymerizable materials can be made by incorporating into epoxy resins, the diaryliodonium salt of formula (I) in combination with organic acids, such as aromatic organic carboxylic acids. In addition, I have further found that besides epoxy resins, other cationically polymerizable materials, such as cyclic ethers, lactones, lactams, cyclic acetals, etc., can be thermally cured with combinations of such organic acids, copper salt or mixtures thereof with iodonium salts of formula (I), or iodonium salts having a non-nucleophilic counterion such as perchlorate, $CF_3SO_3^-$ and $C_6H_4SO_3^-$. Again, where the cationically polymerizable material is a phenol-formaldehyde resin, urea-formaldehyde or melamine-formaldehyde, iodonium salts can be used having in addition to $MQ_d$ and the other non-nucleophilic counterions previously recited, halide counterions such as $Cl^-$, $Br^-$, F and I, as well as nitrate, phosphate, etc.

There is provided by the present invention, a curable composition comprising by weight
(A) a cationically polymerizable organic material, and
(B) from 1% to 35% of the curable composition of a catalyst selected from the class consisting of
  (i) a mixture of
    (a) a diaryliodonium salt of the formula $$[(R)_a(R^1)_bI]_c^+[Y]^-, \text{ and} \quad (II)$$

(b) from 0.01 part to 10 parts, per part of (a), of a copper salt,
  (ii) a mixture of
    (c) the diaryliodonium salt of formula (II)
    (d) from 0.1 part to 15 parts, per part of (c), of organic acid, organic acid anhydride or mixtures thereof and
  (iii) a mixture of
    (e) the diaryliodonium salt of formula (II)
    (f) from 0.01 part to 10 parts, per part of (e) of the copper salt of (b), and
    (g) from 0.1 part to 15 parts, per part of (e), of the organic acid, organic acid anhydride or mixtures thereof of (c), where R, $R^1$, a, b and c are as previously defined, and Y is a non-nucleophilic counterion as defined above. Radicals included by R of formulas (I) and (II) can be the same or different aromatic carbocyclic radicals having from 6 to 20 carbon atoms, which can be substituted with from 1 to 4 monovalent radicals selected from $C_{(1-8)}$ alkoxy, $C_{(1-8)}$ alkyl, nitro, chloro, etc. R is more particularly, phenyl, chlorophenyl, nitrophenyl, methoxyphenyl, pyridyl, etc. Radicals included by $R^1$ of formulas (I) and (II) are divalent radicals such as

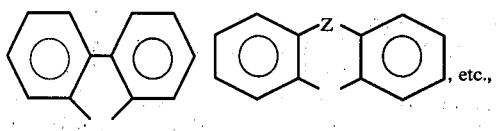, etc., where Z is selected from —O—, —S—,

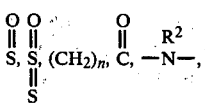

$R^2$ is $C_{(1-8)}$ alkyl or $C_{(6-13)}$ aryl, and n is an integer equal to 1–8 inclusive.

Metal or metalloids included by M of formulas (I) and (II) are transition metals such as Sb, Fe, Sn, Bi, Al, Ga, In, Ti, Zr, Sc, V, Cr, Mn, Cs, rare earth elements such as the lanthanides, for example, Cd, Pr, Nd, etc., actinides, such as Th, Pa, U, Np, etc., and metalloids such as B, P, As, etc. Complex anions included by $MQ_d^{-(d-e)}$ are, for example $BF_4^-$, $PF_6^-$, $AsF_6^-$, $SbF_6^-$, $FeCl_4^{--}$, $SnCl_6^-$, $SbCl_6^-$, $BiCl_5^{--}$, etc.

Iodonium salts included by formulas (I) and (II) are, for example,

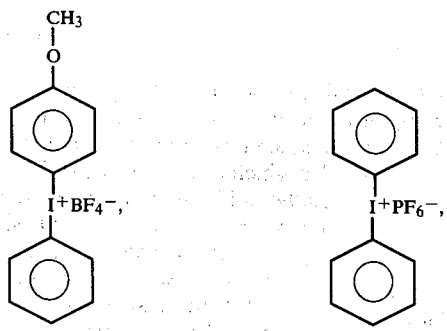

-continued

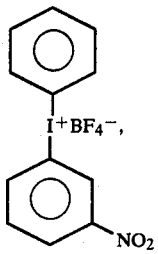, 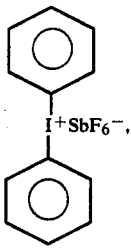,

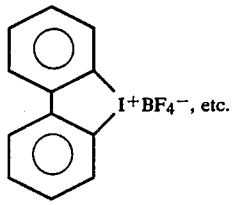

Iodonium salts of formula (I) can be made by the procedure in Crivello U.S. Pat. No. 3,981,897, assigned to the same assignee as the present invention, where contact between an aryl halonium bisulfate and the corresponding hexafluoro acid or salt can be effected under aqueous conditions. Iodonium salts of formulas (I) and (II) also can be made by the procedures described by O. A. Ptitsyna, M. E. Pudecva et al, Dokl., Akad. Nauk, SSSR, 163 383 (1964); Dokl., Chem., 163 671 (1965), F. Marshall Beringer, M. Drexler, E. M. Gindler, etc., J. Am. Chem. Soc., 75 2705 (1953).

Copper salts which can be used include, for example, Cu(I) salts such as copper halides, e.g., Cu(I) chloride etc; Copper (II) salts such as Cu(II) benzoate, Cu(II) acetate, Cu(II) stearate, Cu(II) gluconate, Cu(II) citrate, etc.

Organic acids and organic acid anhydrides which have been found effective in combination with the diaryliodonium salts of formulas (I) and (II) are included by the formulas,

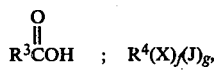

where $R^3$ is a monovalent organic radical selected from $C_{(1-8)}$ alkyl and $C_{(6-13)}$ aryl, $R^4$ is a polyvalent organic radical selected from $C_{(2-8)}$ aliphatic and $C_{(6-13)}$ aryl, X is selected from carboxy and sulfonate, J is

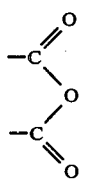

f is an integer equal to 0 to 4 inclusive, g is equal to 0 to 2 and when g is 0, f is equal to 2 to 4, and when g is 1, f is equal to 1 or 2. Some of the organic acids and organic acid anhydrides which can be used are, for example, aliphatic carboxylic acids such as acetic acid, 2-ethylhexanoic acid, hexanoic acid, oleic acid, stearic acid, palmitic acid, succinic acid, azeleic acid, etc.; aromatic carboxylic, for example, benzoic acid, salicylic acid, terephthalic acid, phthalic acid, trimellitic acid, trimellitic anhydride, pyromellitic dianhydride, o-toluic acid; sulfonic acids such as benzene sulfonic acid, p-toluene sulfonic acid, 4-nitrobenzene sulfonic acid, etc.

The term "epoxy resin" as utilized in the description of the cationically polymerizable compositions of the present invention, includes any monomeric, dimeric or oligomeric or polymeric epoxy material containing one or a plurality of epoxy functional groups. For example, those resins which result from the reaction of bisphenol-A (4,4′-isopropylidenediphenol) and epichlorohydrin, or by the reaction of low molecular weight phenolformaldehyde resin (Novolak resin) with epichlorohydrin, can be used alone or in combination with an epoxy containing compound as a reactive diluent. Such diluents as phenyl glycidyl ether, 4-vinylcyclohexene dioxide, limonene dioxide, 1,2-cyclohexene oxide, glycidyl acrylate, glycidyl methacrylate, styrene oxide, allyl glycidyl ether, etc., may be added as viscosity modifying agents.

In addition, the range of these compounds can be extended to include polymeric materials containing terminal or pendant epoxy groups. Examples of these compounds are vinyl copolymers containing glycidyl acrylate or methacrylate as one of the comonomers. Other classes of epoxy containing polymers amenable to cure using the above catalysts are epoxysiloxane resins, epoxy-polyurethanes and epoxy-polyesters. Such polymers usually have epoxy functional groups at the ends of their chains. Epoxy-siloxane resins and method for making are more particularly shown by E. P. Plueddemann and G. Fanger, J. Am. Chem. Soc. 80 632–5 (1959). As described in the literature, epoxy resins can also be modified in a number of standard ways such as reaction with amines, carboxylic acids, thiols, phenols, alcohols, etc., as shown in U.S. Pat. Nos. 2,935,488; 3,235,620; 3,369,055, 3,379,653; 3,398,211, 3,403,199; 3,563,840; 3,567,797; 3,677,995; etc. Further coreactants which can be used with epoxy resins are hydroxy terminated flexibilizers such as hydroxy terminated polyesters, shown in the Encyclopedia of Polymer Science and Technology, Vol. 6, 1967, Interscience Publishers, New York, pp. 209–271 and particularly p. 238.

Included by the thermosetting organic condensation resins of formaldehyde which can be used in the practice of the present invention are, for example, urea type resins, phenol-formaldehyde type resin.

In addition, there can be used melamine thiourea resins, melamine, or urea aldehyde resins, cresol-formaldehyde resins and combinations with other carboxy, hydroxyl, amino and mercapto containing resins, such as polyesters, alkyds and polysulfides.

Some of the vinyl organic prepolymers which can be used to make the polymerizable compositions of the present invention are, for example, $CH_2=CH-O-(CH_2-CH_2O)_{n'}-CH=CH_2$, where n' is a positive integer having a value up to about 1000 or higher; multifunctional vinylethers, such as 1,2,3-propane trivinylether, trimethylolpropane trivinylether, prepolymers having the formula,

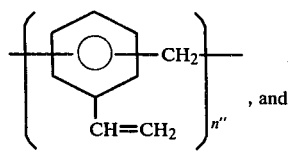, and low molecular weight polybutadiene having a viscosity of from 200 to 10,000 centipoises at 25° C., etc. Products resulting from the cure of such compositions can be used as printing inks and other applications typical of thermosetting resins.

A further category of the organic materials which can be used to make the polymerizable compositions are cyclic ethers which are convertible to thermoplastics. Included by such cyclic ethers are, for example, oxetanes such as 3,3-bis-chloromethyloxethane, alkoxyoxetanes as shown by Schroeter U.S. Pat. No. 3,673,216, assigned to the same assignee as the present invention; oxolanes such as tetrahydrofuran, oxepanes, oxygen containing spiro compounds, trioxane, dioxolane, etc.

In addition to cyclic ethers there are also included cyclic esters such as β-lactones, for example propiolactone, cyclic amines, such as 1,3,3-trimethyl-azetidine and organosilicon cyclics, for example, materials included by the formula,

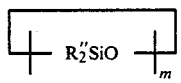

where R" can be the same or different monovalent organic radical such as methyl or phenyl and m is an integer equal to 3 to 8 inclusive. An example of an organosilicon cyclic is hexamethyl trisiloxane, octamethyl tetrasiloxane, etc. The products made in accordance with the present invention are high molecular weight oils and gums.

The heat curable compositions of the present invention can be made by blending the polymerizable organic material with at least an effective amount (i.e. at least about 0.1% by weight) of the diaryliodonium salt and in further combination, as previously defined, with the other cocatalysts such as the copper salt, organic acid, organic acid anhydride, etc. The resulting curable composition can be in the form of a varnish having a viscosity of from 1 to 100,000 centipoises at 25° C. or a free flowing powder, depending upon the nature of the cationically polymerizable organic material. The curable compositions can be applied to a variety of substrates by conventional means and cured to the tack-free state within 0.5 to 20 minutes, depending upon the temperature employed.

In certain instances, an organic solvent, such as nitromethane, acetonitrile, can be used to facilitate the mixing of various ingredients. The diaryliodonium salts can be formed in situ if desired. In addition, the curable compositions may contain inactive ingredients, such as silica, talc, clay, glass fibers, extenders, hydrated alumina, carbon fibers, process aids, etc., in amounts of up to 500 parts of filler per 100 parts of cationically polymerizable organic material. The curable compositions can be applied to such substrates as metal, rubber, plastic, molded parts of films, paper, wood, glass, cloth, concrete, ceramic, etc.

Some of the applications in which the curable compositions of the present invention can be used are, for example, protective, decorative and insulating coatings, pitting compounds, printing inks, sealants, adhesives, molding compounds, wire insulation, textile coatings, laminates, impregnated tapes, varnishes, etc.

In order that those skilled in the art will be better able to practice the invention, the following examples are given by way of illustration and not by way of limitation. All parts are by weight.

EXAMPLE 1

Various blends of Shell Epon 828, bisphenol-A-diglycidyl ether, and a diaryliodonium-Cu(II) salt catalyst were heated for about 5 minutes to determine their respective cure temperatures, "CT". A wide variety of diaryliodonium $MQ_d$ salts of formula (I) in combination with several Cu(II) salts were utilized. The following table shows the results obtained where the weight percent is shown of diaryliodonium salt and the Cu(II) salt in the respective blends, based on total weight of mixture, and "Ph" is phenyl.

| Iodonium Salt (2%) | Cu(II) Salt (WT %) | CT (°C.) |
|---|---|---|
| $PH_2IAsF_6$ | None | 215 |
| " | benzoate (0.04) | 112 |
| " | benzoate (0.5) | 105 |
| $Ph_2ISbF_6$ | None | 171 |
| " | benzoate (0.5) | 105 |
| $Ph_2IBF_4$ | None | 210 |
| $Ph_2IBF_4$ | benzoate (0.5) | 135 |
| $Ph_2IAsF_6$ | stearate (0.2) | 148 |
| " | stearate (0.5) | 115 |
| $(4\text{-}t\text{-}butPh)_2IAsF_6$ | benzoate (0.5) | 106 |
| $(4\text{-}Cl\text{-}Ph)_2IAsF_6$ | benzoate (0.5) | 106 |
| $(4\text{-}CH_3\text{-}Ph)_2IAsF_6$ | benzoate (0.5) | 108 |
| $Ph_2IAsF_6$ | acetate (0.5) | 142 |

In the above table, cure was determined by applying the curable mixture onto a steel substrate and heating it in an oven until the applied curable mixture formed a tack-free cured film.

EXAMPLE 2

A mixture of bisphenol-A diglycidyl ether and 3% by weight of diphenyliodonium hexafluoroarsenate was respectively blended with 3% of benzoic acid and 6 and 10% of trimellitic anhydride by weight. The resulting curable mixtures were then heated at a rate of 10° C. per minute to determine the minimum temperature required to gel the bis-epoxide. It was found that a temperature of 225° C. was required to gel the bis-epoxide when the mixture was free of aromatic carboxylic acid. However, the 3% by weight benzoic acid mixture gelled at 120° C., while the 6 and 10% trimellitic anhydride mixture gelled at 150°-160° C., respectively.

EXAMPLE 3

A variety of curable mixtures were prepared utilizing 3,4'-epoxycyclohexylmethyl-3',4'-epoxycyclohexane carboxylate, 3% by weight of diphenyliodonium hexafluoroarsenate and a range of between about 3%-6% by weight of various organic acids. The mixtures were heated in an oil bath to determine the respective gel times. The temperature of the oil bath was 170° C. The following results were obtained, where "Acid" signifies the organic acid or organic acid anhydride employed.

| Acid | Weight (%) | Gel Time(sec) |
|---|---|---|
| None | 0 | >900 |
| Acetic | 6 | 170 |
| Stearic | 6 | 215 |
| Benzene sulfonic | 6 | 135 |
| Trimellitic anhydride | 6 | 160 |
| " | 10 | 150 |

-continued

| Acid | Weight (%) | Gel Time(sec) |
|---|---|---|
| 2-hydroxybenzoic acid (salicylic acid, COOH/OH on benzene) | 6 | 300 |
| 4-isopropylbenzoic acid (CH3-CH-CH3 on benzene, COOH) | 3 | 225 |
| 4-hydroxybenzoic acid (HO-benzene-COOH) | 6 | 165 |
| 3,5-dinitrobenzoic acid (NO2, NO2 on benzene, COOH) | 3 | 225 |
| 3-nitro-4-hydroxybenzoic acid (NO2, OH on benzene, COOH) | 6 | 165 |
| 3,4-dichlorobenzoic acid (Cl, Cl on benzene, COOH) | 6 | 115 |
| 3-hydroxybenzoic acid (HO-benzene-COOH, OH) | 6 | 123 |

The above results show that a significant reduction in gel time was achieved when the organic acid was utilized in combination with the diaryliodonium salt.

EXAMPLE 4

There were added 0.2 part of diphenyliodonium hexafluoroarsenate, 0.1 part of benzoic acid and 0.05 part copper benzoate to 10 parts of an allyl ether resole condensation product of phenol and formaldehyde containing multifunctional hydroxy methyl groups (Methylon 75108 resin of the General Electric Company). The mixture was stirred in an oil bath at 120° C. The mixture gelled and hardened at 120° C. to a rigid crosslinked mass within 5 minutes. The composition is useful as a potting material for electrical components.

EXAMPLE 5

There was added 0.1 part of copper benzoate and 0.2 part of diphenyliodonium hexafluoroarsenate to 10 parts caprolactone. The mixture was heated for 20 minutes at 120° C. The resulting highly viscous reaction mixture was poured into methanol. There was obtained 9.5 parts polycaprolactone having an intrinsic viscosity in methylene chloride of 0.4 dl/g.

EXAMPLE 6

Ten parts of a mixture of 3% by weight of diphenyliodonium hexafluoroarsenate, 6% by weight of copper benzoate, 51% by weight of cycloaliphatic bisepoxide (CY-179, of the Ciba Geigy Company) and 40% by weight of hydroxyl terminated polyester (R-101-110, of the Hooker Chemical Company) was placed in an aluminum cup. The mixture was heated for 10 minutes at 130° C. On cooling, there was obtained a rubbery material capable of being flexed 180° C. without breaking.

EXAMPLE 7

Graphite cloth (Morganite I produced by the Whittaker Corporation, Costa Mesa, Calif.) was impregnated with the following mixture:

| | |
|---|---|
| Epoxy cresol novolac (ECN 1299) of the Ciba Geigy Co. | 20 parts |
| Diphenyliodonium hexafluoroarsenate | 3 parts |
| Diglycidyl ether of bisphenol-A (Epon 828) of the Shell Chemical Company | 80 parts |
| Trimellitic anhydride | 10 parts |
| Copper benzoate | 1 part |

The cloth was then cut into 4"×6" pieces. A four layer laminate was made from the aforementioned piece. The laminate was then pressed at 165°–170° C. at 50 psi for 3 minutes. There is obtained a rigid cured solvent resistant graphite fiber reinforced laminate having excellent mechanical properties.

EXAMPLE 8

A molding compound was made by mixing 394 parts of a granulated filler-epoxy preblend, 18.75 parts of trimellitic anhydride, 3.75 parts of diphenyliodonium hexafluoroarsenate, 0.15 part of copper stearate, 9 parts of powdered carnauba wax 6 parts of powdered Cornelius wax, and 75 parts of $\frac{1}{4}$" chopped glass fiber. The filler-epoxy preblend was based on the use of 8,365 parts of hydrated alumina and 1,050 parts of titanium dioxide, 3,500 parts of pulverized Epi-Rez SU-8 (an epoxy novolac resin of the Celanese Chemical Company) and 875 parts of pulverized Epon 1009, a BPA epoxy resin of the Shell Chemical Company. The filler-epoxy preblend was initially sintered, followed by compounding it with a Sterling extruder.

The molding compound was granulated for evaluation after it had been sheeted on a roll mill. The granulated molding material free of particles finer than 20 mesh was molded in accordance with ASTM D955 for 3–5 minutes at 350° F. at a pressure of 2000–3000 psi. There were obtained ASTM discs and dog bone specimens providing the following properties:

| | Dry Powder | Preforms (preheated) | Test Method |
|---|---|---|---|
| Molding Properties | | | |
| Molding Temp. | 350° F. | 350° F. | |
| Cure Cycle | 45 sec. | — | |
| Mold Shrinkage - 5 in bars | | 3.6 mil/in | D955 (ASTM) |
| Physical Properties | | | |
| Specific Gravity | | 1.83–1.85 | D570 |
| Hardness, Rockwell | M88±10 | M110±4 | D785 |
| Mechanical Properties | | | |
| Tensile Strength (psi) | 4300±300 | 5100±600 | D638 |
| Flexural Strength (psi) | 10900±400 | 9800±500 | D790 |
| Compressive Strength (psi) | 18100±500 | 17000±1500 | D695 |
| Drop Ball ($\frac{1}{2}$ lb, in) | 10±1 | 10±1 | |
| Notched Izod (ft-lb/in) | 0.37±.04 | 0.53±.1 | D256 |
| Thermal Properties | | | |
| HDT | 460±7° F. | 435±13° F. | D648 |
| Electrical Properties | | | |

| | Dry Powder | Preforms (preheated) | Test Method |
|---|---|---|---|
| Arc Resistance | 199±1 | 196±2 | D495 |

EXAMPLE 9

There was formulated, 33.5 parts of platy talc, 33.5 parts of hydrated alumina, 13 parts of trimellitic anhydride, 3.9 parts of diphenyliodonium hexafluoroarsenate, 3.6 parts of powdered paraffin wax and 0.6 part of stearic acid with 268 parts of a granulated preblend of hydrated alumina, platy talc and epoxy resin, and 145 parts of epoxy coated glass fiber. The granulated preblend of platy talc and hydrated alumina was initially prepared from a mixture of 140 parts of platy talc, 140 parts of hydrated alumina, 45.75 parts of Epon 1001 BPA epoxy resin of the Shell Chemical Company, and 48.75 parts of ECN 1299, an epoxy cresol novolac resin of the Ciba-Geigy Chemical Company. The epoxy coated glass fiber was prepared from a mixture of 75 parts of chopped glass fibers, 32.5 parts of Epon 1001 and 32.5 parts of ECN 1299.

The above formulation was then dry blended and roll milled at temperatures in the range of between 30°–90° C. for several minutes. The resulting mixture was then further tumble blended with additional stearic acid after being granulated.

Several ASTM specimens were prepared in accordance with the procedures of Example 8. The resulting specimens provided the following properties:

| | | Test Method |
|---|---|---|
| Molding Properties (Compression) | | |
| Molding temperature | 350° F. | |
| Cure cycle | | |
| - Dry powder | 60 sec. | |
| - Preforms (preheated) | 40 sec. | |
| Mold shrinkage | | |
| - 5 × ½ × ⅛ bars (mils/in) | 2.1±0.1 | D955 (ASTM) |
| Physical Properties | | |
| Specific gravity | 1.93 | |
| Water absorption | | D570 |
| - 25° C. (24 hrs, %) | 0.06 | |
| - 100° C. (2 hrs, %) | 0.22 | |
| Burning characteristics | V-O | UL-94 |
| Hardness, Rockwell | M97±10 | D785 |
| Mechanical Properties | | |
| Tensile strength (psi) | 5700±1700 | D638 |
| Flexural strength (psi) | 11,000±2000 | D790 |
| Flexural Modulus (psi × 10⁶) | 1.84±0.14 | |
| Compressive Strength (psi) | 16,000±1900 | D695 |
| Notched izod (ft-lb/in) | 0.57±0.01 | D256 |
| Thermal Properties | | |
| Thermal coefficient of expansion (in/in ° F. × 10⁻⁵) | 14. | D696 |
| Heat deflection temperature (265 psi) | 475° F. | D648 |
| - Flex. strength (% retention) | 9800±1200 (91%±22%) | |
| - Flex. modulus (% retention) | 1.84±0.09 (100%±8%) | |
| Electrical Properties | | |
| Arc resistance, sec. | 199±5 | D495 |

Although the above examples are directed to only a few of the very many variables included by the curable compositions of the present invention, it should be understood that the curable compositions can comprise a much broader variety of cationically polymerizable organic materials, diaryliodonium salts, copper salts and organic acids as shown in the description preceding these examples. There are also shown in my copending application Ser. No. 861,127, filed Dec. 16, 1977, now abandoned, filed concurrently herewith Curable Organic Resin Compositions and Foaming Method, and in copending application Ser. No. 841,351, filed Oct. 12, 1977, Heat Curable Compositions and Method of Curing Same, additional diaryliodonium organic resin compositions, where both applications are assigned to the same assignee as the present invention.

What I claim as new and desire to secure by Letters Patent of the United States is:

1. A curable composition comprising by weight (A) a cationically polymerizable organic material, and (B) from 1% to 35% of the curable composition of a catalyst selected from the class consisting of
   (i) a mixture of
      (a) a diaryliodonium salt of the formula, $$[(R)_a (R^1)_b I]^+ [Y]^-, \text{ and}$$

(b) from 0.01 part to 10 parts, per part of (a), of a copper salt,
   (ii) a mixture of
      (c) the diaryliodonium salt of (a) and
      (d) from 0.1 part to 15 parts, per part of (c), of organic acid, organic anhydride, or mixtures thereof and
   (iii) a mixture of
      (e) the diaryliodonium salt of (a)
      (f) from 0.01 part to 10 parts, per part of (e), of the copper salt of (b), and
      (g) from 0.1 part to 15 parts, per part of (e), of the organic acid, organic acid anhydride or mixtures thereof of (c), where R is a monovalent aromatic organic radical, $R^1$ is a divalent aromatic organic radical, a is a whole number equal to 0 or 2, b is a whole number equal to 0 or 1 and when a is 0, b is 1, and when b is 0, a is 2 and Y is an anion.

2. A curable composition in accordance with claim 1, where the cationically polymerizable material is an epoxy resin.

3. A curable composition in accordance with claim 1, where the cationically polymerizable material is a phenolformaldehyde resin.

4. A curable composition in accordance with claim 1, where the diaryliodonium salt has the formula,

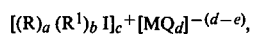

$$[(R)_a (R^1)_b I]_c^+ [MQ_d]^{-(d-e)},$$

where R is a monovalent aromatic organic radical, $R^1$ is a divalent aromatic organic radical, M is a metal or metalloid, Q is a halogen radical, a is a whole number equal to 0 or 2, b is a whole number equal to 0 or 1 and the sum of a+b is equal to 2 or the valence of I, c=d−e, e equals the valence of M and is an integer equal to 2-7 inclusive and d>e and is an integer having a value up to 8.

5. A curable composition in accordance with claim 1, where a mixture of copper salt and the diaryliodonium salt is employed.

6. A curable composition in accordance with claim 1, where a mixture of organic acid or organic acid anhydride and the diaryliodonium salt is employed.

7. A curable composition in accordance with claim 1, where the mixture of organic acid, the diaryliodonium salt and copper salt is employed.

8. A curable composition in accordance with claim 7, where the organic acid is trimellitic anhydride.

9. A curable composition comprising by weight
(C) an epoxy resin,
(D) from 1% to 35% of the curable composition of a catalyst selected from the class consisting of
   (g) a diaryliodonium salt of the formula, $$[(R)_a (R^1)_b I]_c^+ [MQ_d]^{-(d-e)}, \text{ and}$$

(h) from 0.01 part to 10 parts, per part of (g), of a copper salt,
   (v) a mixture of
   (j) the diaryliodonium salt of (g) and
   (k) from 0.1 part to 15 parts, per part of (j), of organic acid, organic acid anhydride or mixtures thereof and
   (vi) a mixture of
   (m) the diaryliodonium salt of (g)
   (n) from 0.01 part to 10 parts, per part of (m), of the copper salt of (h), and
   (o) from 0.1 part to 15 parts, per part of (m) of the organic acid, organic acid anhydride or mixtures thereof of (k),
where R is a monovalent aromatic organic radical, $R^1$ is a divalent aromatic organic radical, M is a metal or metalloid, Q is a halogen radical, a is a whole number equal to 0 or 2, b is a whole number equal to 0 or 1 and when a is 0, b is 1, and when b is 0, a is 2, $c = d - e$, e equals the valence of M and is an integer equal to 2-7 inclusive and $d > e$ and is an integer having a value up to 8.

10. A curable composition in accordance with claim 9, where the diaryliodonium salt is diphenyliodonium hexafluoroarsenate and copper salt is copper benzoate.

11. A curable composition in accordance with claim 9, comprising by weight (A) a platy talc, hydrated alumina, glass fiber filled epoxy resin, and (B) from 1% to 35% of a mixture of trimellitic anhydride, diphenyliodonium hexafluoroarsenate and copper stearate.

12. A curable composition in accordance with claim 9, comprising by weight (A) a hydrated alumina, titanium dioxide filled epoxy resin and (B) from 1% to 35% of a mixture of trimellitic anhydride, diphenyliodonium hexafluoroarsenate, and stearic acid.

13. A composition curable by heat comprising
(A) a cationically polymerizable organic material and
(B) an effective amount of a diaryl iodonium salt catalyst selected from the class consisting of
   (i) a mixture of
   (a) a diaryliodonium salt
   (b) from 0.01 part to 10 parts by weight, per part of the diaryliodonium salt of a copper salt
   (ii) a mixture of
   (c) a diaryliodonium salt
   (d) from 0.1 to 15 parts by weight, per part of the diaryliodonium salt of an organic acid, organic anhydride or mixtures thereof
   (iii) a mixture of
   (e) a diaryliodonium salt
   (f) from 0.01 part to 10 parts by weight, per part of the diaryliodonium salt of copper salt
   (g) from 0.1 part to 15 parts by weight, per part of the diaryliodonium salt of an organic acid, organic anhydride or mixtures thereof.

14. A composition curable by heat comprising
(E) a cationically polymerizable organic material,
(F) an effective amount of a diaryliodonium salt catalyst,
(G) up to 500 parts of filler per 100 parts of (E), where the diarylidonium salt catalyst is a member selected from the class consisting of
   (iv) a mixture of
   (h) a diaryliodonium salt
   (j) from 0.01 part to 10 parts by weight, per part of the diaryliodonium salt of a copper salt
   (v) a mixture of
   (k) a diaryliodonium salt
   (m) from 0.1 to 15 parts by weight, per part of the diaryliodonium salt of an organic acid, organic anhydride or mixtures thereof
   (vi) a mixture of
   (n) a diaryliodonium salt
   (o) from 0.01 part to 10 parts by weight, per part of the diaryliodonium salt of copper salt
   (p) from 0.1 part to 15 parts by weight, per part of the diaryliodonium salt of an organic acid, organic anhydride or mixtures thereof.

15. A composition in accordance with claim 13, where the cationically polymerizable organic material is an epoxy resin.

16. A heat curable composition in accordance with claim 14, where the filler is glass fiber and the cationically polymerizable organic material is an epoxy resin.

* * * * *